United States Patent

Geary

[11] B 3,997,175
[45] Dec. 14, 1976

[54] SHAFT SEAL ASSEMBLY

[75] Inventor: Carl H. Geary, Greensburg, Pa.

[73] Assignee: Carrier Corporation, Syracuse, N.Y.

[22] Filed: Jan. 24, 1975

[21] Appl. No.: 544,034

[44] Published under the second Trial Voluntary Protest Program on February 17, 1976 as document No. B 544,034.

[52] U.S. Cl. .................................. 277/27; 277/74; 277/84
[51] Int. Cl.² ..................... F16J 15/16; F16J 15/44
[58] Field of Search ................... 277/27, 75, 74, 84, 277/71

[56] References Cited
UNITED STATES PATENTS

| 2,956,825 | 10/1960 | Hore et al. | 277/27 |
| 3,149,846 | 9/1964 | Verbeek | 277/27 |
| 3,561,773 | 2/1971 | Baumann | 277/71 |
| 3,695,621 | 10/1972 | Damaratowski | 277/75 |

Primary Examiner—Samuel B. Rothberg
Attorney, Agent, or Firm—J. Raymond Curtin; Thomas J. Wall

[57] ABSTRACT

A shaft seal assembly employing oil breakdown bushings including bushing supports having a radial spring constant which permits the bushing to move radially with the shaft as the shaft is deflected and an axial spring constant whereby the bushing is able to resist axial movement when under pressure.

7 Claims, 4 Drawing Figures

FIG. 3

SHAFT SEAL ASSEMBLY

BACKGROUND OF THE INVENTION

This invention relates to a shaft seal and in particular to a visco-type seal having one or more breakdown bushings encompassing the shaft of a rotary machine.

In many high pressure rotary machines, such as turbines and compressors, a high pressure oil stream is created about the shaft at one or both end closures of the machine. The oil establishes a barrier about the shaft which functions to prevent the high pressure gases contained within the machine from escaping to atmosphere. Typical of such a sealing arrangement is that disclosed by Damratowski in U.S. Pat. No 3,695,621, which issued October 1972. This type of sealing assembly normally consists of a number of bushing rings which loosely encompass the shaft. A first gas side bushing is positioned adjacent to the process gases on the high pressure side of the closure. One or more "breakdown bushings" are radially aligned behind the gas side bushing with the alignment extending outwardly towards the low pressure side of the closure. A sealing fluid, typically oil, is introduced between the gas side seal and the shaft under a positive pressure that is slightly higher than the pressure of the working fluids contained within the machine. An oil-to-gas interface is thus established for preventing the process gases from moving outwardly along the shaft. A clearance is maintained between the inner surface of each breakdown bushing and the outer periphery of the shaft whereby the sealing oil moves from the high pressure side of the sealing assembly towards atmosphere. As the oil moves beneath the breakdown bushings, the high pressure in the oil stream is uniformly broken down until it finally is reduced to atmospheric pressure.

The pressure dropped by the sealing fluid during the breakdown process is normally transmitted to each of the free-floating breakdown bushings. A relatively high axial load is thus induced in each bushing which forces the bushing laterally into contact against the stator which houses the bushing. Under high load conditions, the bushing can bind or become locked against the stator to establish a hydrodynamic stiffness in the system. The bushings thus act as bearings in regard to the shaft and become cross coupled to the rotor journal bearings. When this occurs, the natural frequency of the rotor system is drastically changed which, of course, has a harmful effect on the operation of the machine.

SUMMARY OF THE INVENTION

It is therefore an object of the present invention to improve visco-type shaft seal assemblies employing bushing rings.

A further object of the present invention is to improve the operation of rotary-type machines by reducing cross coupling between a shaft seal assembly and the shaft support bearings.

These and other objects of the present invention are attained in a visco-type shaft seal utilizing one or more breakdown bushings by means of a bushing support structure that permits the bushing to move in a radial direction in conformity with the shaft as the shaft undergoes deflection but prevents the bushing from shifting in an axial direction whereby the bushing is prevented from locking against the stator housing.

BRIEF DESCRIPTION OF THE DRAWINGS

For a better understanding of the present invention as well as other objects and further features thereof, reference is had to the following detailed description of the invention to be read in conjunction with the accompanying drawings, wherein.

DESCRIPTION OF THE PREFERRED EMBODIMENT

Figure 1:
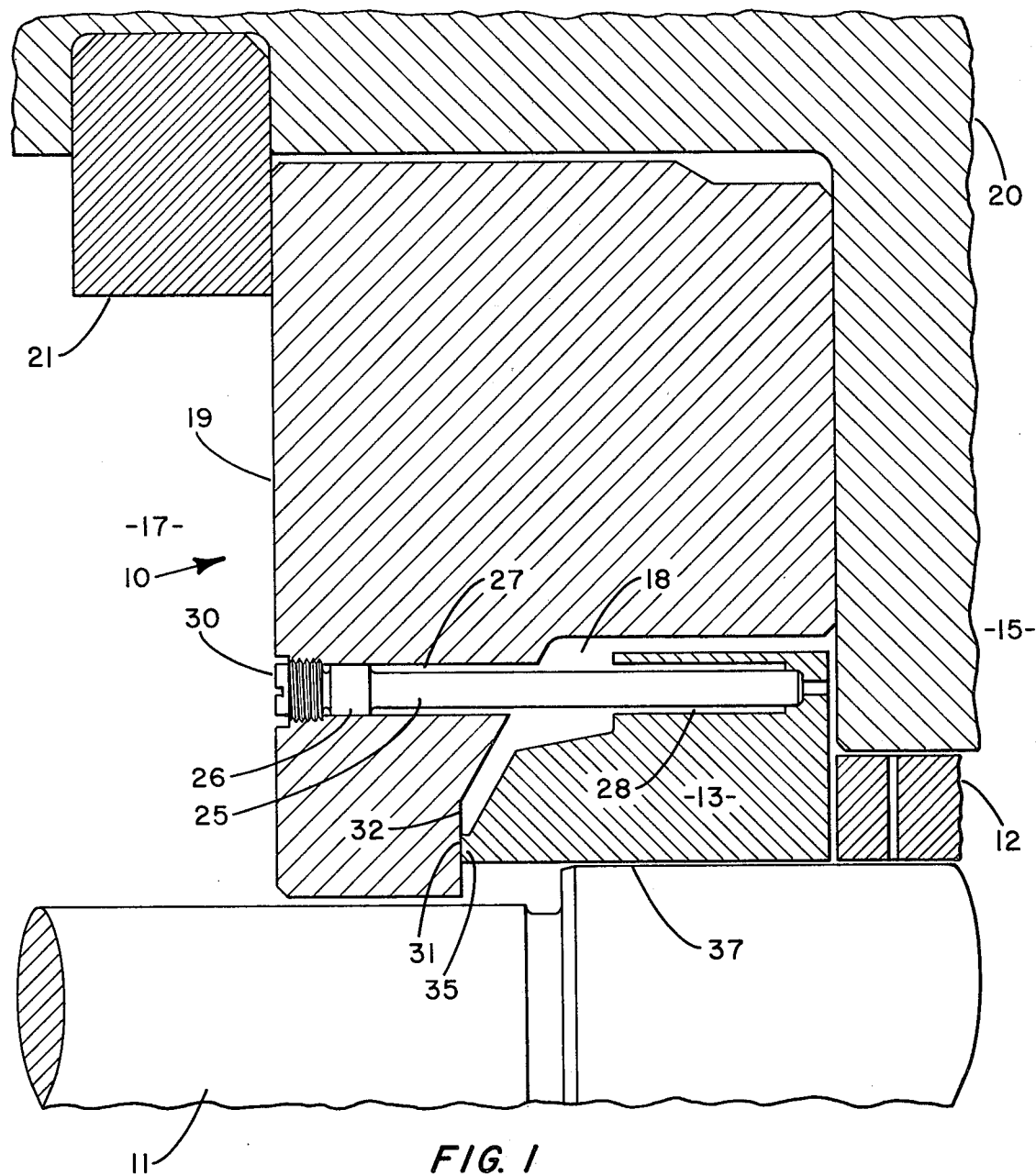
FIG. 1 is a partial side view in section showing a single breakdown bushing and a bushing support mechanism emcompassing the teachings of the present invention.

For explanatory purposes and clarity of disclosure, the present invention will be first described in reference to FIG. 1, illustrating a shaft seal assembly 10 emcompassing the shaft 11 of a rotary machine, such as a turbine or a compressor, the assembly including a gas side seal 12 and a single breakdown bushing 13. As disclosed in the previously noted Damratowski patent, a sealing fluid, such as oil, is introduced into the seal assembly between the shaft and the gas side seal. The pressure of the sealing fluid delivered into the system is maintained at a slightly higher pressure than the pressure of the working substance contained within the machine, the high pressure area herein being referenced 15. The sealing fluid is caused to move along the shaft beneath the bushing 13 towards the low pressure side of the system 17. Accordingly, the pressure in the sealing fluid is dropped over single breakdown bushing 13, however, it should be understood that the reduction in pressure can be achieved in a series of steps over a plurality of bushings.

Breakdown bushing 13, which loosely encompasses the shaft, is housed within an annular opening 18 formed in the end wall closure 19 of the machine. The end wall is secured in the machine casing 20 by means of a suitable shear key 21. In this particular arrangement, the end wall serves both as a closure device in regard to the rotary machine and as a stator for housing the breakdown bushing.

As shown in FIG. 1, the breakdown bushing of the present invention is supported in cantilevered fashion from stator 19 by means of a series of circumferentially spaced support members 25. Although the members can take any cross-sectional form, the members illustrated in FIG. 1 are round beams of relatively short lengths. Each member is supported at one end within the stator by means of an enlarged bearing surface 26 that is press fitted into the stator body in axial alignment with openings 27. The unsupported end of each beam extends laterally into the stator opening and passes through a clearance hole 28 formed in the bushing. The free end of the beam is press fitted into the bushing with the end face of the beam in abutting contact against the bushing body. An enlarged screw thread 30 is formed at the stator end of each beam. The screw is threaded into a tapped hole formed in the stator whereby the position of each individual beam can be accurately adjusted in assembly.

High axial forces generated within the breakdown system are exerted upon the bushing which normally tend to displace the bushing from the high pressure side of the system 15 towards the low pressure side 17. If these high axial forces are unopposed, the end face 31 of the bushing will move into locking contact against side wall 32 of the stator opening. This unwanted axial shifting of the bushing is herein prevented by the present bushing support. The short beams provide the support with an axial stiffness sufficient to resist the displacement forces acting on the bushing. Furthermore, the beams are provided with sufficient flexibility in the radial direction to allow the bushing to move in compliance with the shaft as it undergoes load induced deflections. The bushing is thus prevented from accepting any part of the shaft load and is therefore incapable of acting as a bearing in respect to the rotor system. Unwanted cross coupling between the bushing and the support bearings is avoided.

The maximum deflection of each beam making up the bushing support network can be derived in the axial direction from the compression relationship of a short beam as follows:

$$\delta = \frac{PL}{AE} \tag{1}$$

where:
 $\delta$ is the maximum allowable axial deflection for the system,
 $P$ is the axial load exerted on each beam,
 $L$ is the length of the beam,
 $A$ is the area of the beam, and
 $E$ is the modulus of elasticity of the beam material.

The axial spring constant for each beam can also be found in terms of maximum deflection whereby:

$$K_a = \frac{P}{\delta} = \frac{AE}{L} = \frac{\pi d^2 E}{4.0 L} \tag{2}$$

where:
 $d$ is the diameter of the beam.

Similarly, the maximum deflection of each beam in the radial direction, which is the maximum deflection of the shaft under load, is derived from the cantilevered beam relationship:

$$\delta_p = \frac{PL^3}{3EI} \tag{3}$$

where:
 $P$ is the radial load acting on each beam, and
 $I$ is the moment of inertia of the beam.

Assuming that the beam is a round bar of relatively short length, the moment of inertia is:

$$I = \frac{\pi d^4}{64} \tag{4}$$

By applying the relationships (1, 2, 3 and 4) above, a suitable beam geometry can be found for a support system having a stiffness in the axial direction for preventing axial movement of the bushing beyond allowable limits while allowing the bushing sufficient radial flexibility to move in compliance with the shaft as it is deflected. The spring constant of each beam in the radial direction can be found by the following relationships:

$$K_r = \frac{P}{\delta_r} = \frac{3EI}{L^3} = \frac{3\pi d^4 E}{64L^3} = \frac{.147 d^4 E}{L^3} \tag{5}$$

Comparing the axial spring constant of the beam with its radial spring constant shows that for a short beam having a small cross-sectional diameter, the beam rate in an axial direction is infinitely greater than that in the radial direction, or:

$$K_a = \frac{64L^2}{12d^2} K_r \tag{6}$$

and thus satisfies the requirements of the support network.

Referring once again to FIG. 1, the end face 31 of breakdown bushing 19 is provided with an annular embossed section 35 which is arranged to rest in contact against the side wall 32 of the stator. The embossed section serves as a seal having one-point contact in relation to the stator for substantially preventing high pressure sealing fluid from moving between the stator and the breakdown bushing.

Figure 2:
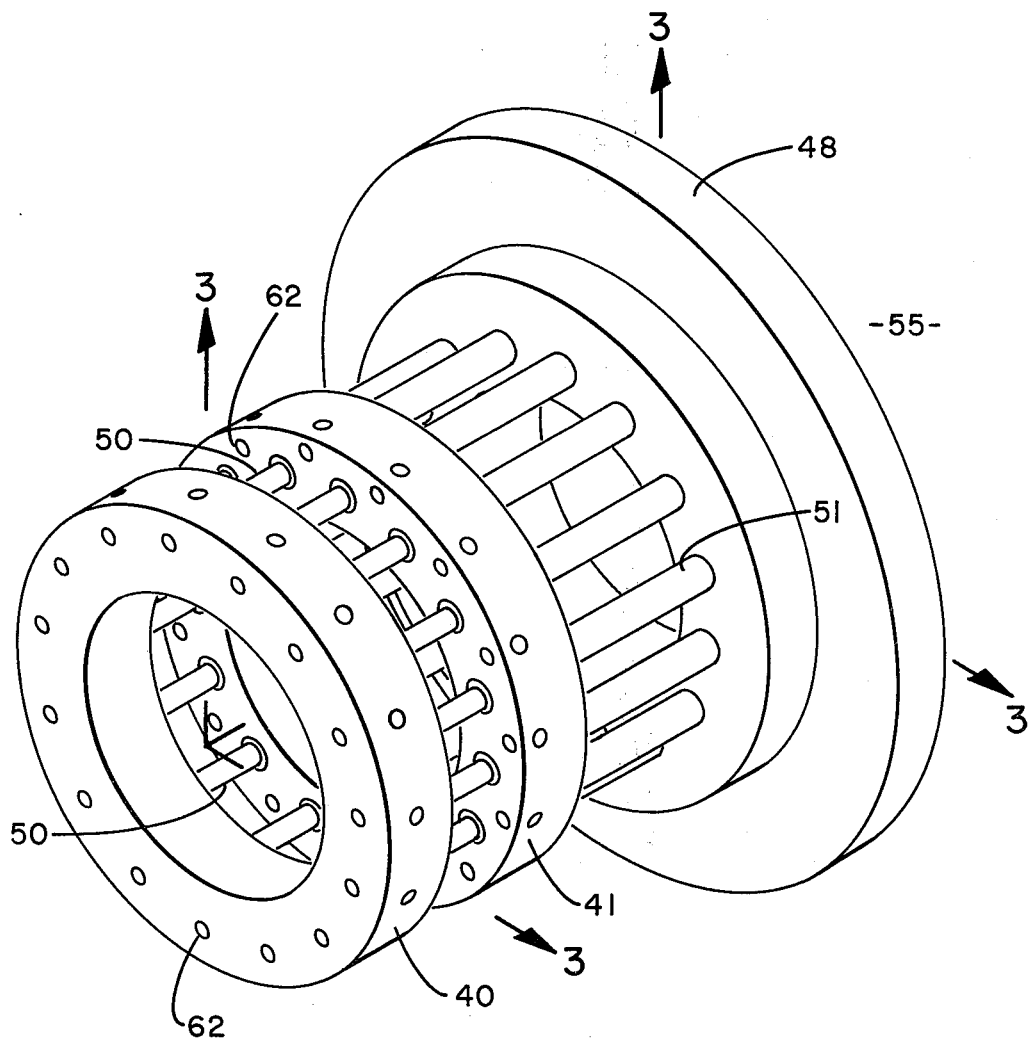
FIG. 2 is a perspective view illustrating a plurality of breakdown bushings supported in accordance with the teachings of the present invention.
Figure 3:
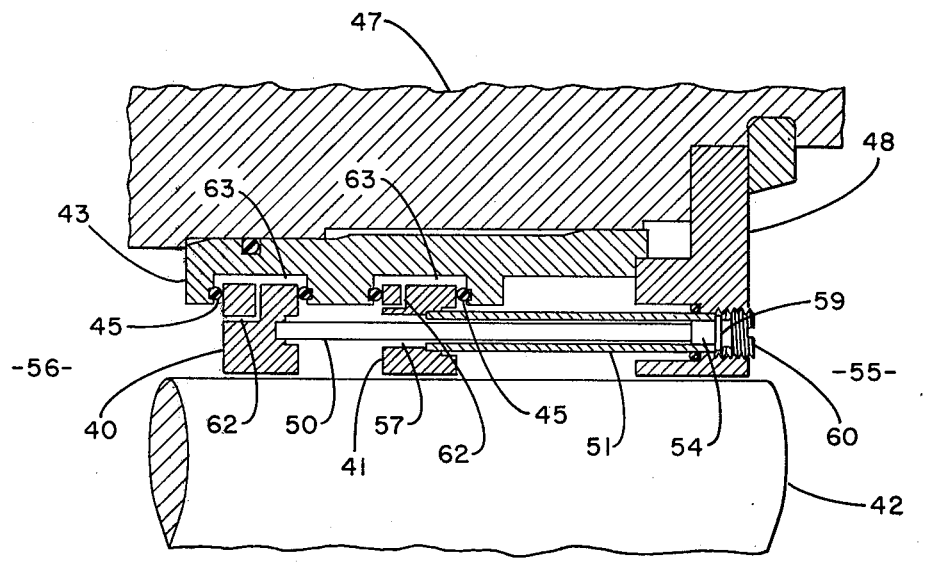
FIG. 3 is a section taken along line 3—3 in FIG. 2 showing the machine and bushing support structure in greater detail.

Referring now specifically to FIGS. 2 and 3, there is illustrated a second embodiment of the invention adapted to support a plurality of breakdown bushings from the end wall closure of a rotary machine. As best illustrated in FIG. 2, bushings 40 and 41, which encompass shaft 42, are carried within openings formed in stator 43. O-rings 45 are positioned between the radially extending walls of the stator opening and the side walls of the bushings to prevent sealing oil from freely passing therebetween. The stator is secured against movement by means of the machine casing 47 and the end wall closure 48.

Bushing 40 is cantilevered from the end wall by means of a series of circumferentially spaced circular beams 50. Bushing 41 is similarly supported in the end wall by beams 51. The beams 50 are arranged to pass through hollow openings in support beams 51. The end portion of each beam 50 is provided with an enlarged section 54 which is press fitted into the opening formed in the left-hand end of beam 51, as viewed in FIG. 2, to form a more or less unitized structure at the end wall section of the support system. The outer beams 51 are secured in the end wall by press fitting so that the beam network extends axially from the low pressure side 55 of the system towards the high pressure side 56. The shorter hollow outer beams 51 are press fitted into the first bushing 41. The longer solid beams pass through a clearance hole 57 formed in bushing 51 and are similarly press fitted into second bushing 40. The beam structure is secured in the end wall by means of a washer 59 and a threaded plug 60 acting thereagainst.

In practice, the beams are tuned as explained above to provide each bushing in the series with sufficient axial stiffness to prevent the bushing from shifting laterally under load while simultaneously permitting the bushing to move radially with the shaft as the shaft undergoes deflection. To further enhance the damping characteristics of the sealing system, each of the bushings has a spaced series of passages 62 formed therein extending from the high pressure side of the bushing into a cavity 63 formed by the top surface of the bushing, the stator opening and the O-rings acting therebetween. The passage allows sealing oil to pass into the cavity under pressure. As the shaft is deflected, the film of oil maintained in the cavity is squeezed between the stator and the bushing to provide positive damping to the system. A second damping feature is also encompassed in the support structure. The internal opening formed within hollow beams 51 is slightly larger than the outside diameter of the solid beams 50 passing therethrough. The clearance hole 57 formed in bushing 41 enables the sealing oil to penetrate into the region between the two telescoped elements. Here again, a thin film of oil is established between the two beams which adds positive damping to the system thus further enhancing its frequency response.

Figure 4:
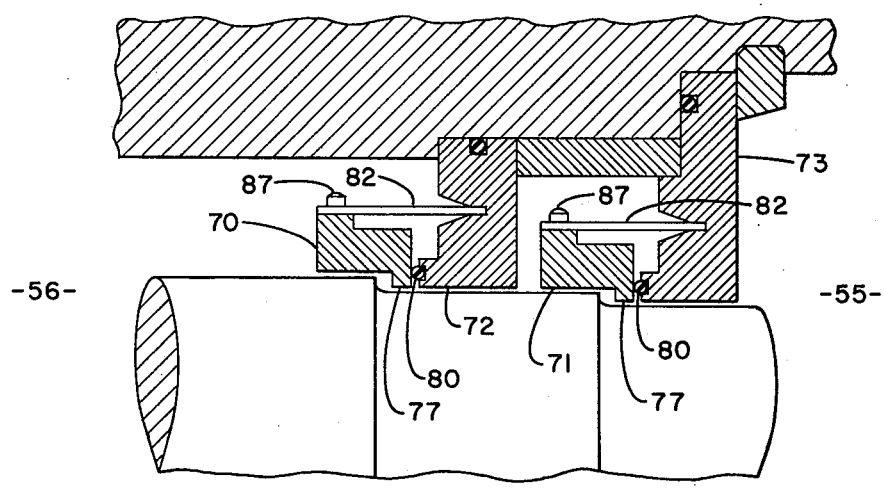
FIG. 4 is a side sectional view illustrating another arrangement of supporting a plurality of bushings in assembly which embodies the teachings of the present invention.

Referring now to FIG. 4, there is illustrated another embodiment of the invention whereby a plurality of bushings can be mounted in a visco seal assembly. Each bushing in the assembly, as for example bushings 70, 71, are aligned in contiguous relation with a companion stator 72, 73, that are arranged to encompass shaft 75. The shaft is stepped down as it passes beneath each bushing-stator combination. An inwardly extended radial lip 77, formed upon each bushing, is accepted into the stepped down region. Annular O-rings 80 are mounted between the bushings and the stator wall to prevent sealing oil from moving between the two adjacent members.

Each bushing is supported from its companion stator by means of a series of circumferentially spaced flat springs 82. Each spring is pressed into a laterally extended opening formed in the high pressure side of the stator and the bushings suspended from the free end thereof by means of cap screw 87. Here again, the axial spring constant of each spring is tuned to minimize axial movement of the bushings thus preventing the bushings from locking against the stators. The radial spring constant, on the other hand, is sufficiently soft to permit the bushings to move radially in compliance with the shaft as it undergoes deflection thereby preventing the bushings from accepting any of the shaft load.

While this invention has been described with reference to the structure herein disclosed, it is not necessarily confined to the details as set forth, and this application is intended to cover any modifications or changes as may come within the scope of the following claims.

What is claimed is:
1. In a shaft seal assembly of the type wherein a high pressure fluid is passed between the shaft and at least one bushing encompassing the shaft, the assembly including
   a series of circumferentially spaced beams substantially aligned axially with the shaft, the beams being secured against movement at one end and supporting the bushing in coaxial alignment about the shaft at the opposite end,
   said beams having a high spring constant in the axial direction to prevent the bushing from being displaced axially by the high pressure fluid and having a relatively lower spring constant in the radial direction to permit the bushing to move radially in compliance with the shaft as the shaft is deflected, and
   adjusting means operatively associated with the beams for adjusting the axial position thereof.

2. In a seal assembly of the type wherein a high pressure sealing fluid is passed between a plurality of aligned breakdown bushings and a shaft of a rotary machine to prevent working substances from escaping from the machine to surrounding areas of lower pressure, the improvement comprising
   a stationary mounting structure positioned on the low pressure side of the seal assembly adjacent to the last breakdown bushing in the alignment,
   a plurality of circumferentially spaced support columns secured in the stationary structure and extending axially towards the bushing alignment,
   a first series of support members in said plurality being connected to the first adjacent bushing in said alignment for suspending the first bushing in axial alignment about the shaft,
   at least a second series of support members in said plurality being arranged to pass beyond the first adjacent bushing and being connected to the next adjacent bushing in the alignment to suspend the next adjacent bushing in substantial axial alignment with said shaft, and
   said support members in each series having a relatively high spring constant in the axial direction whereby the bushing supported thereon resists high pressure forces acting to displace the bushing in an axial direction and having a lower spring constant in the radial direction to permit the bushing to move radially in compliance with the shaft as the shaft is deflected under load.

3. The apparatus of claim 2 wherein said second series of support columns passes through axially extended openings formed in said first series of support columns.

4. The apparatus of claim 3 wherein a clearance region is provided between the openings in the first series of support columns and the outer periphery of the second series of support columns passing therethrough, the columns being arranged so that sealing fluid can enter said clearance region.

5. The apparatus of claim 4 further including stator means overlying each of said bushings and having openings therein for loosely housing at least the outer periphery of said bushing.
   seal means extending between the stator and the bushing for establishing a substantially enclosed cavity in a region between the stator openings and the bushing, and
   passage means formed within each bushing for placing the cavity in fluid flow communication with the sealing oil.

6. In a shaft seal assembly of the type wherein a high pressure sealing fluid is passed between a plurality of aligned breakdown bushings and a shaft of a rotary machine to prevent working substances from escaping from the machine to surrounding areas of lower pressure, the improvement comprising
   a plurality of breakdown bushings encompassing the shaft, the bushings being arranged in parallel alignment about the shaft,
   a plurality of stationary members equal in number to the breakdown seals encompassing the shaft and being secured to the machine casing, each member being positioned adjacent to a companion bushing on the low pressure side thereof,
   a series of bushing support elements secured at one end within each of said stationary members and being arranged in circumferentially spaced relationship thereabout with the opposite end of each element supporting said adjacent bushing in cantilevered suspension about the shaft, and said support elements having a relatively high spring constant in the axial direction whereby the bushing supported thereon resists high pressure forces acting to displace the bushing in an axial direction, and having a lower spring constant in the radial direction to permit the bushing to move radially in compliance with the shaft as the shaft is deflected under load.

7. The assembly of claim 6 wherein said support elements are flat spring elements.

* * * * *